United States Patent [19]

Favalora et al.

[11] Patent Number: 5,480,203
[45] Date of Patent: Jan. 2, 1996

[54] PULLING TOOL FOR PULLING CONNECTORIZED CABLE

[75] Inventors: Mark L. Favalora, Niantic; Randolph J. Minor, Stonington, both of Conn.

[73] Assignee: Hubbell Incorporated, Orange, Conn.

[21] Appl. No.: 182,420

[22] Filed: Jan. 18, 1994

[51] Int. Cl.$^6$ ........................................................ F16L 3/00
[52] U.S. Cl. ...................................... 294/86.42; 24/115 N
[58] Field of Search ............................... 294/74, 86.42;
24/115 N, 122.6; 138/123, 129, 130; 174/75 C,
78, 79, 84 R, 90; 248/60; 254/134.3 R,
134.3 CL, 134.3 FT; 285/235, 236, 305;
403/223, 291

[56] References Cited

U.S. PATENT DOCUMENTS

| | | |
|---|---|---|
| 832,343 | 10/1906 | Scott . |
| 832,401 | 10/1906 | Martin . |
| 1,114,637 | 10/1914 | Nolan . |
| 1,521,789 | 6/1925 | Oswald . |
| 1,686,250 | 10/1928 | Page . |
| 1,732,410 | 10/1929 | Martin . |
| 1,802,657 | 4/1931 | Kellems . |
| 1,807,993 | 6/1931 | Martin . |
| 1,994,674 | 3/1935 | Van Inwagen, Jr. . |
| 2,112,281 | 3/1938 | Ferris ............................. 294/86.42 X |
| 2,181,392 | 11/1939 | Chatham ............................. 24/115 N |
| 2,268,598 | 1/1942 | Kellems ............................. 294/86.42 |
| 2,434,358 | 1/1948 | Frank ............................. 294/86.42 X |
| 2,602,207 | 7/1952 | Kellems . |
| 2,698,150 | 12/1954 | Di Palma . |
| 2,740,178 | 4/1956 | Kellems . |
| 2,766,501 | 10/1956 | Kellems . |
| 3,133,725 | 5/1964 | Lanum . |
| 3,136,844 | 6/1964 | Petersen . |
| 3,137,765 | 6/1964 | Lanum . |
| 3,192,617 | 7/1965 | Meyer . |
| 3,291,507 | 12/1966 | Clay . |
| 3,431,947 | 3/1969 | Hines . |
| 3,551,959 | 1/1971 | Mastalski . |
| 3,599,913 | 8/1971 | Di Palma . |
| 3,932,697 | 1/1976 | Hood ............................. 24/122.6 X |
| 4,055,875 | 11/1977 | Strickland . |
| 4,225,172 | 9/1980 | Marguardt ............................. 294/86.42 X |
| 4,368,910 | 1/1983 | Fidrych . |

FOREIGN PATENT DOCUMENTS

| | | | |
|---|---|---|---|
| 1079398 | 4/1960 | Germany | ............................. 294/86.42 |
| 3040760 | 5/1982 | Germany | ............................. 294/86.42 |

OTHER PUBLICATIONS

Kellems—Wire Management Products, 1992 Catalog, pp. 1 & 8–60.

*Primary Examiner*—Johnny D. Cherry
*Attorney, Agent, or Firm*—Jerry M. Presson; David L. Tarnoff

[57] ABSTRACT

A pulling tool for gripping a cable or cables, especially fragile cables such as fiber optic cables. The pulling tool can pull such fragile cables with or without fragile connectors coupled to their free ends. The pulling tool has a mesh sleeve with an open tail end for receiving the ends of the cables, and a closed lead end with a ring or pulling member coupled thereto. The sleeve is constructed of a plurality of thin, flexible strands tightly interwoven together to form a longitudinally compressible and laterally expandable tube. The strands are tightly interwoven to prevent the cables or connectors from protruding outwardly from the sleeve. The sleeve is also highly flexible to permit the sleeve to be folded or rolled up.

19 Claims, 3 Drawing Sheets

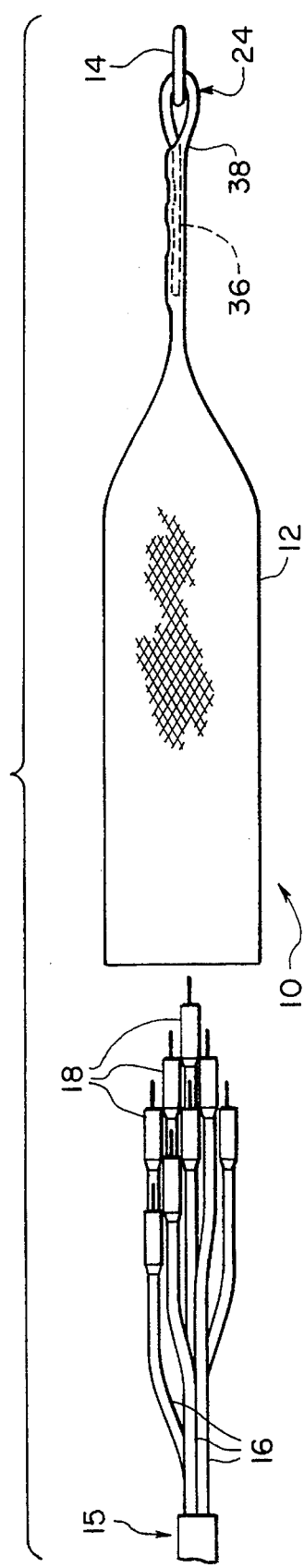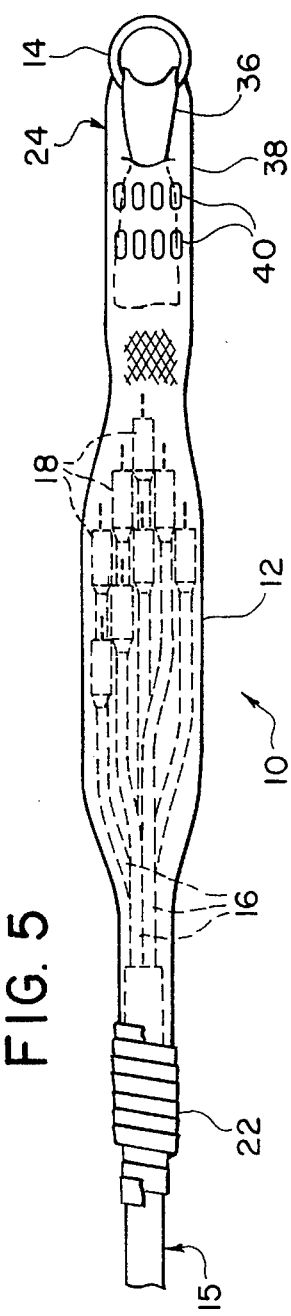
FIG. 4
FIG. 5

PULLING TOOL FOR PULLING CONNECTORIZED CABLE

FIELD OF THE INVENTION

The present invention relates to a pulling tool for pulling a cable or cables, especially fragile cables such as fiber optic cables with fragile connectors secured to the ends of the cables. The pulling tool includes a tightly braided mesh sleeve made of a flexible material with a pulling member or ring coupled thereto.

BACKGROUND OF THE INVENTION

Cable grips or pulling tools for drawing, holding and supporting electrical cables are well known in the art. Many of these prior pulling devices include a braided open wire mesh sleeve formed from interwoven metallic wire strands which may be expanded radially by longitudinal compression to enable them to readily receive the cable and radially contracted by longitudinal stretching to frictionally engage the periphery of the cable. Subsequently applied forces tending to separate the grip from the cable or to move the grip along the cable cause a firmer grip on the cable.

Examples of these prior art pull devices are disclosed in the following U.S. patents: U.S. Pat. No. 832,343 to Scott; U.S. Pat. No. 832,401 to Martin; U.S. Pat. No. 1,114,637 to Nolan; U.S. Pat. No. 1,521,789 to Oswald; U.S. Pat. No. 1,686,250 to Page; U.S. Pat. No. 1,732,410 to Martin; U.S. Pat. No. 1,802,657 to Kellems; U.S. Pat. No. 1,760,074 to Martin; U.S. Pat. No. 1,807,993 to Martin; U.S. Pat. No. 1,994,674 to Inwagen, Jr.; U.S. Pat. No. 2,602,207 to Kellems; U.S. Pat. No. 2,698,150 to Di Palma; U.S. Pat. No. 2,740,178 to Kellems; U.S. Pat. No. 2,766,501 to Kellems; U.S. Pat. No. 3,133,725 to Lanum; U.S. Pat. No. 3,136,844 to Petersen; U.S. Pat. No. 3,137,765 to Lanum; U.S. Pat. No. 3,192,617 to Meyer; U.S. Pat. No. 3,291,507 to Clay; U.S. Pat. No. 3,431,947 to Hines; U.S. Pat. No. 3,551,959 to Mastalski; U.S. Pat. No. 3,599,913 to Di Palma; U.S. Pat. No. 4,055,875 to Strickland; and U.S. Pat. No. 4,368,910 to Fidrych.

Such pulling devices are suitable for the fairly rugged electrical cables, but significant problems arise when the cable to be pulled is small and/or fragile. An example is fiber optic cable which comprises a flexible jacket encasing a single optical fiber or a bundle of optical fibers therein. Such fragile cables can be easily crushed or its optical characteristics can be distorted if the radial compressive forces on the cables are localized and become too great. Also, the optical fiber can be easily broken when subjected to excessive bending forces. In addition, it is typical to have pre-assembled on the end of the fiber optic cable a fragile optical connector receiving one or a bundle of optical fibers therein and secured thereto by epoxy and a crimp or some other suitable fastener. Again, this fragile connector is highly susceptible to crushing radial compressive forces as well as longitudinal tension forces which could easily snap the connector from the cable.

Moreover, fiber optic cable is much smaller in diameter than the typical electrical cable. These small diameters in most cases are much less than the conventional wire mesh grips can adequately hold. Also, the fiber optic connector at the end of the fiber optic cable has a much larger outside diameter than the cable so that a conventional grip selected to fit and adequately grip the cable cannot expand enough to accept the larger connector diameter. Conversely, a grip designed to receive the large diameter connector cannot compress enough to grip the smaller cable diameter. A typical example is a connector with a 0.5 inch outer diameter and a cable with a 0.073 inch outer diameter.

A method presently used to protect a fiber optic cable connector during pulling comprises wrapping the connector in a layer of foam rubber and then inserting this into a plastic sleeve which in turn is inserted into an oversized wire mesh grip. This method, however, is expensive and time consuming since conventional wire mesh grips are relative stiff, thereby creating extreme difficulty in inserting the small and flexible cable with a connector attached. In addition, after assembly of this combination, the holding capability of the oversized wire mesh is marginal and may allow slippage of the cable and pull out of the pre-assembled connector.

In view of the above, it is apparent that there exists a need to provide a pulling device which can be utilized with fragile cable with a connector pre-assembled thereto, and which is inexpensive to manufacture. This invention addresses these needs in the art along with other needs which will become apparent to those skilled in the art once given this disclosure.

SUMMARY OF THE INVENTION

Accordingly, a primary object of the present invention is to provide a pulling tool for pulling fragile cable with or without a connector at the end thereof, whether a single or a plurality of cables and connectors are involved.

Another object of the present invention is to provide a pulling tool for pulling fragile cable such as fiber optic cable with a fiber optic connector at the end thereof.

Another object of the present invention is to provide a pulling tool that encapsulates the end of the fragile cable including the fragile connector located thereon, and that can adequately grip the cable without crushing the cable itself.

Another object of the present invention is to provide a pulling tool that can be quickly and easily attached to a pulling line or tape.

Another object of the present invention is to provide a pulling tool that is relatively inexpensive to manufacture and relatively simple to use.

The foregoing objects are basically attained by a pulling tool for gripping a cable having a terminal end, comprising a pulling member; a mesh sleeve formed of a plurality of thin, flexible strands braided together to encapsulate the terminal end of the cable, and having a closed lead end and an open tail end, the strands being tightly interwoven to laterally expand the sleeve during longitudinal compression of the sleeve and to laterally contract the sleeve during longitudinal extension of the sleeve, the lead end having a first portion of the sleeve overlying a second portion of the sleeve to form a loop for receiving the pulling member therein; and a fastening member for coupling the first portion of the lead end of the sleeve to the second portion of the sleeve.

Other objects, advantages and salient features of the present invention will become apparent from the following detailed description which, taken in conjunction with the annexed drawings, discloses a preferred embodiment of the present invention.

BRIEF DESCRIPTION OF THE DRAWINGS

Referring now to the drawings which form a part of this original disclosure:

FIG. 4 is a top plan view of the pulling tool illustrated in FIGS. 1-3 with the connectorized fiber optic cables inserted within the pulling tool and fixedly coupled to the pulling tool by tape;

FIG. 5 is a side elevational view of the pulling tool fixedly coupled to the connectorized fiber optic cables as illustrated in FIG. 4;

DETAILED DESCRIPTION OF THE INVENTION

Figure 1:
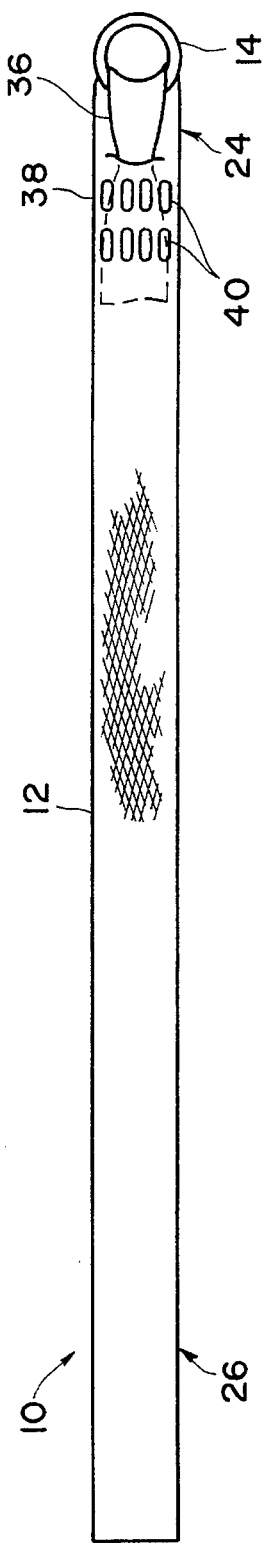
FIG. 1 is a top plan view of a pulling tool in accordance with the present invention.
Figure 2:
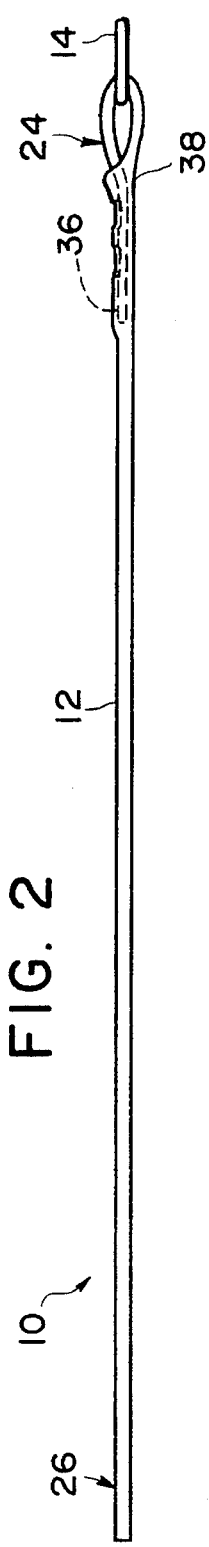
FIG. 2 is a side elevational view of the pulling tool illustrated in FIG. 1 in accordance with the present invention.
Figure 3:
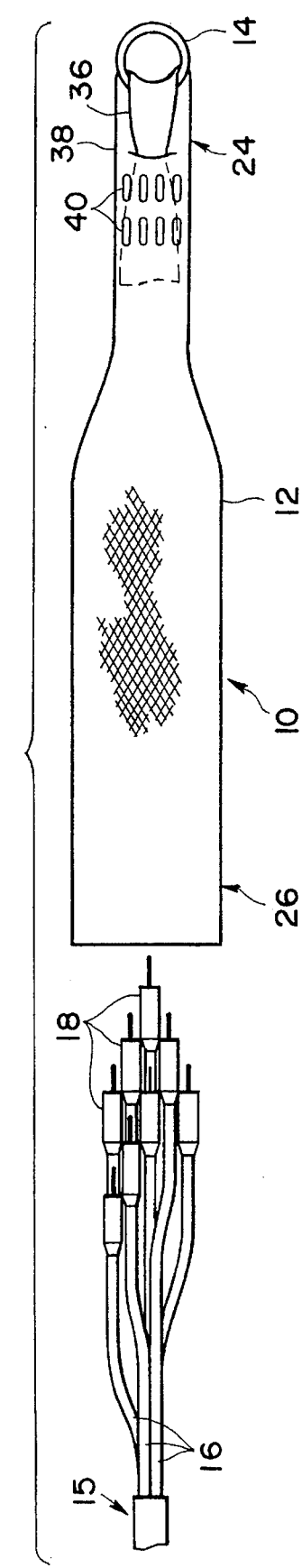
FIG. 3 is a top plan view of the pulling tool illustrated in FIGS. 1 and 2 with its tail end expanded for receiving connectorized fiber optic cables.
Figure 7:
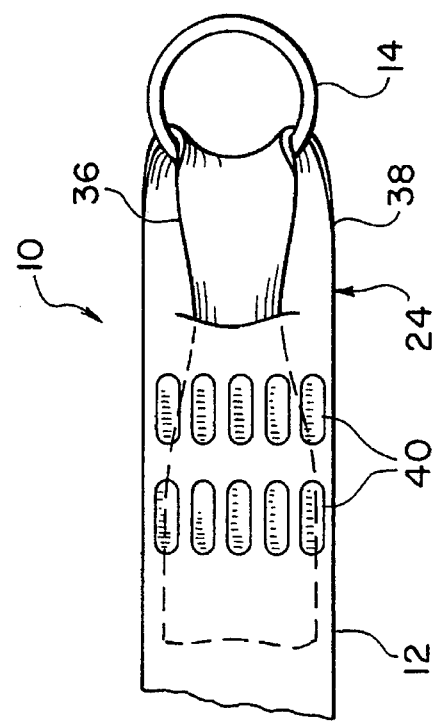
FIG. 7 is a partial, enlarged top plan view of the lead end of the pulling tool illustrated in FIGS. 1-6.

As seen in FIGS. 1-3, a pulling tool 10 in accordance with the present invention includes a braided mesh sleeve 12 and a ring or pulling member 14 coupled to mesh sleeve 12. Pulling tool 10 is designed to encapsulate the terminal end of a cable or bundle 15 having cables 16 with connectors 18 secured thereto as particularly seen in FIGS. 3-5. Preferably, tape 22 or some other suitable fastening device is used to securely couple the cables 16 with connectors 18 to pulling tube 10 as discussed below. Pulling tool 10 is especially useful in pulling small fragile cables with connectors such as connectorized fiber optic cables.

Figure 6:
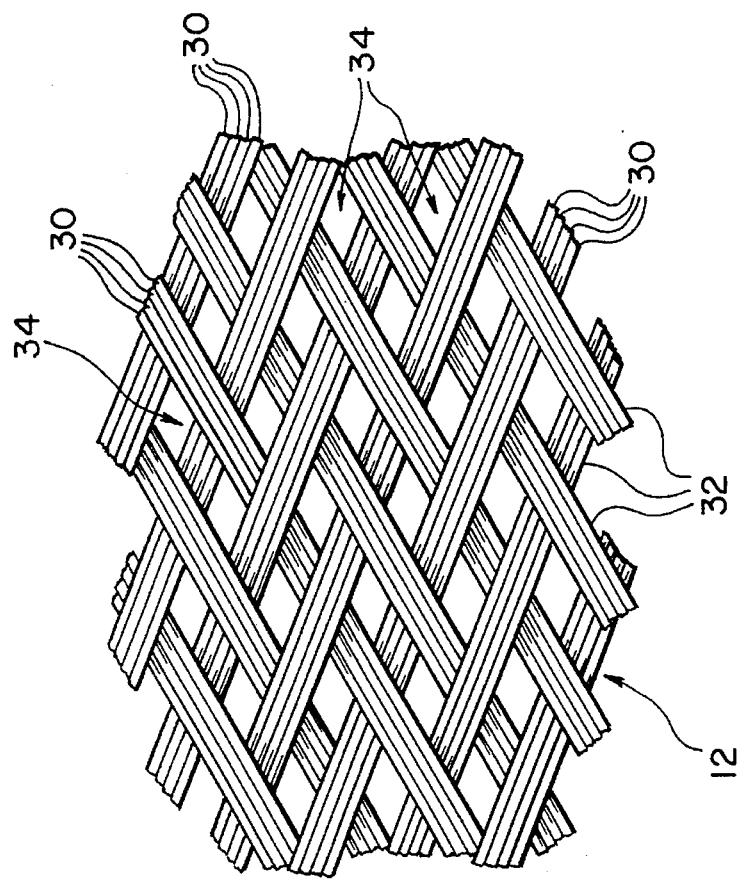
FIG. 6 is a partial, enlarged top plan view of a portion of the pulling tool illustrated in FIGS. 1-5.

Mesh sleeve 12 has a lead end 24 with pulling member or ring 14 coupled thereto, and an open tail end 26 for receiving and encapsulating the terminal ends of cables 16 and their connectors 18. As seen in FIG. 6, mesh sleeve 12 is formed from a plurality of strands or filaments 30 which are interwoven in the form of a tube. The weave or interlacing of strands 30 is such that when the sleeve 12 is longitudinally or axially compressed, the sleeve 12 decreases in length and increases or expands in size radially to receive the fragile cable 16 with the fragile connectors 18 therein. Once the cables 16 with connectors 18 are suitably received within mesh sleeve 12, the mesh sleeve 12 can be axially stretched which results in a reduction of its size radially into a gripping action on the fragile cables 16 and connectors 18.

Strands 30 are constructed of a material which is relatively soft and resilient so that mesh sleeve 12 can be easily flexed as well as rolled up or folded for storage. Suitable materials for strands 30 include a resilient polyester filament, a resilient nylon filament, and a resilient nylon/ polyester filament. Other suitable polymeric materials or plastic like material can also be used. Preferably, the strands 30 are also relatively smooth and somewhat slippery so that the strands 30 of sleeve 12 will slide along the surfaces of the cables 16 and connectors 18 when the sleeve 12 is axially stretched to cause the sleeve 12 to firmly encapsulate cable 16 and connectors 18. Strands 30 have a diameter preferably ranging from about 0.010 inch to about 0.015 inch in diameter. Of course, the diameter of the strands may be slightly larger or smaller as needed so long as the resiliency and flexibility of strands 30 are not adversely affected.

In the preferred embodiment, two different size strands 30 are used in constructing mesh sleeve 12, such that the overall thickness of the mesh sleeve 12, i.e., two layers of mesh material, is approximately 0.060 inch when lying substantially flat. Sleeve 12 is woven with strands 30 in such a manner that sleeve 12 is somewhat elastic or resilient. In other words, after sleeve 12 is axially compressed, sleeve 12 will spring back to its normal length once the axially compressive force is released.

More specifically, the interlacing or weave of sleeve 12 is performed by a machine which divides strands 30 into a plurality of groups 32 of two or more strands 30 together, and then spirally interweaves the groups 32 of strands 30 together to form mesh tube or sleeve 12 with a very tight braid such that the spacing or opening 34 formed between each group of strands 30 is approximately about 0.030 inch to about 0.050 inch. Of course, the spacing 34 between the groups 32 of strands 30 can be larger if needed or desired. For example, the spacing between the groups 32 of strands 30 can be as large as approximately 0.100 inch so long as the spacing between the groups of strands 30 is smaller than any portion of the cables 16 or connectors 18 which are to be encapsulated within sleeve 12.

Preferably, groups 32 of strands 30 include three or more strands 30 with one of the strands having a diameter of about 0.015 inch and the remaining strands having a diameter of about 0.010 inch. Alternatively, one of the strands 30 in group 32 can have a diameter approximately twice the diameter of one of the remaining strands 30 in groups 32. Each group 32 of strands 30 extend spirally along the longitudinal axis of mesh sleeve 12 with each strand 30 being arranged side by side with adjacent strands 30 within each group 32. In other words, strands 30 in each of the groups 32 are arranged side by side so that each group 32 of strands 30 lies substantially flat. Accordingly, sleeve 12 has a very thin tubular wall consisting of strands 30 interwoven together.

The interweaving of strands 30 in the above-described manner permits sleeve 12 to expand in its cross-sectional area when axially compressed more than twice the cross-sectional area of the sleeve 12 when it's at rest. Also, this close interweaving of strands 30 provides a more uniform pressure on cables 16 and connectors 18 since sleeve 12 can conform more easily to the shape of the cables 16 and connectors 18.

Ring or pulling member 14 is preferably a rigid metallic, ring which is coupled to lead end 24 of sleeve 12. In particular, lead end 24 of mesh sleeve 12 is looped about ring 14 such that ring 14 is movably coupled to lead end 24 of mesh sleeve 12. While ring 14 is preferably circular, it will be apparent that ring 14 can be other shapes such as D-shaped or triangular. Also, ring 14 can be constructed of a flexible and/or resilient material, if desired.

The looped lead end 24 of mesh sleeve 12 is preferably formed by folding a first portion 36 of the mesh sleeve 12 back upon itself, i.e., second portion 38, and then fastening the end of the folded back portion 36 of mesh sleeve 12 to the second portion 38 of sleeve 12 by suitable fastening means such as heat welds 40 or stitching. In the preferred embodiment, the looped lead end 24 is formed by folding portion 36 of lead end 24 of mesh sleeve 12 back upon itself and inserting the free end of portion 36 of the sleeve 12 through the weave of the mesh sleeve 12, and finally heat welding the end of portion 36 of sleeve 12 to an intermediate portion 38 of sleeve 12 to form the looped lead end 24.

As seen in the series of FIGS. 3-5, the fragile cables 16 with fragile connectors 18 coupled thereto are inserted into the open tail end 26 of mesh sleeve 12 by first axially compressing mesh sleeve 12 to increase the diameter of mesh sleeve 12 to allow the cables 16 with connectors 18 to pass therein. Once the sleeve 12 is so radially expanded by the axial compression, the fragile connectors 18 and cable 16 are maneuvered completely along the inside of sleeve 12 so as to completely protect the ends of the cables 16 and the connectors 18 coupled thereto.

Next, the mesh sleeve 12 is axially stretched to thereby radially compress sleeve 12 into a gripping engagement with the cables 16 and connectors 18 to secure the cables 16 and connectors 18 within sleeve 12 as seen in FIGS. 4 and 5. Since the strands 30 are smooth and somewhat slippery, the mesh sleeve 12 will slide along the exterior surfaces of cables 12 and connectors 18 so as to conform to their overall outer shape without damaging them. Also, since the sleeve 12 is very tightly weaved with very small openings between the groups of strands 30, the connectors 18 will not protrude outwardly from the sleeve 12 and the sleeve will provide more uniform pressure on the cables 16 and connectors 18.

Finally, a fastening member or device such as tape 22 is wrapped about the open tail end 26 of mesh sleeve 12 and a portion of the fiber optic bundle 15 so as to fixedly secure the fiber optic bundle to the mesh sleeve 12. Tape 22 is important since sleeve 12 is somewhat slippery.

The combined pulling tube and fiber optic bundle can now be pulled as desired, with, for example, a pulling wire or line being coupled to the ring or pulling member 14. Once the combined pulling tool 10 and bundle 15 are pulled to their desired location, tape 22 can be removed and sleeve 12 axially compressed to radially expand sleeve 12. Then, the cables 16 and connectors 18 of the bundle 15 are removed from the sleeve 12 of pulling tube 10.

The size or width of the relatively flat pulling tool 10 can range in width depending upon the size of cables and/or connectors which are to be pulled. For example, the width of the pulling tool 10 can be ½ inch, 1 inch, or 3 inches depending upon the desired application. Of course, the size of the strands 30 and the spacing 34 between the groups 32 of strands 30 as well as the flexibility and resiliency of the strands 30 should remain relatively consistent. Thus, the pulling tool 10 in accordance with the present invention can be used with a variety of cables with or without connectors as needed.

While only one embodiment has been chosen to illustrate the invention, it will be understood by those skilled in the art that various changes and modifications can be made herein without departing from the scope of the invention as defined in the appended claims.

What is claimed is:

1. A pulling tool for gripping a member such as a cable having a terminal end, comprising:

a pulling member;

a resilient mesh sleeve formed of a plurality of thin, flexible strands braided together to encapsulate the terminal end of the cable, and having a closed lead end and an open tail end, said strands being tightly interwoven to laterally expand said sleeve during longitudinal compression of said sleeve and to laterally contract said sleeve during longitudinal extension of said sleeve, said lead end having a first portion of said sleeve overlying a second portion of said sleeve to form a loop for receiving said pulling member therein, said strands being arranged in a plurality of spirally extending groups with each of said groups of said strands being positioned side by side and one of said strands in at least one of said groups of said strands having a diameter larger than at least one other of said strands in said at least one of said groups of said strands; and fastening means for fixedly coupling said first portion of said lead end of said sleeve to said second portion of said sleeve.

2. A pulling tool according to claim 1, wherein said one strand has a diameter approximately twice that of said other strand.

3. A pulling tool for gripping a member such as a cable having a terminal end, comprising:

a pulling member;

a resilient mesh sleeve formed of a plurality of thin, flexible strands braided together to encapsulate the terminal end of the cable, and having a closed lead end and an open tail end, said strands being tightly interwoven to laterally expand said sleeve during longitudinal compression of said sleeve and to laterally contract said sleeve during longitudinal extension of said sleeve, said lead end having a first portion of said sleeve overlying a second portion of said sleeve to form a loop for receiving said pulling member therein, said strands being arranged in a plurality of spirally extending groups with each of said groups of said strands being positioned side by side and each of said groups having one of said strands with a diameter larger than at least one other of said strands within each of said groups; and fastening means for fixedly coupling said first portion of said lead end of said sleeve to said second portion of said sleeve.

4. A pulling tool for gripping a member such as a cable having a terminal end, comprising:

pulling member;

a resilient mesh sleeve formed of a plurality of thin, flexible strands braided together to encapsulate the terminal end of the cable, and having a closed lead end and an open tail end, said strands being tightly interwoven to laterally expand said sleeve during longitudinal compression of said sleeve and to laterally contract said sleeve during longitudinal extension of said sleeve, said lead end having a first portion of said sleeve overlying a second portion of said sleeve to form a loop for receiving said pulling member therein, said strands being arranged in a plurality of spirally extending groups with each of said groups of said strands being positioned side by side and each of said groups having one of said strands with a diameter larger than the remaining said strands within each of said groups; and fastening means for fixedly coupling said first portion of said lead end of said sleeve to said second portion of said sleeve.

5. A pulling tool for gripping a member such as a cable having a terminal end, comprising:

a pulling member;

a resilient mesh sleeve formed of a plurality of thing flexible strands braided together to encapsulate the terminal end of the cable, and having a closed lead end and an open tail end, said strands being tightly interwoven to laterally expand said sleeve during longitudinal compression of said sleeve and to laterally contract said sleeve during longitudinal extension of said sleeve, said lead end having a first portion of said sleeve overlying a second portion of said sleeve to form a loop for receiving said pulling member therein, said first portion of said sleeve extending through a space formed between a pair of adjacent said strands so as to be positioned inside said sleeve; and fastening means for fixedly coupling said first portion of said lead end of said sleeve to said second portion of said sleeve.

6. A pulling tool according to claim 5, wherein said pulling member is a ring.

7. A pulling tool according to claim 6, wherein said ring is substantially circular.

8. A pulling tool according to claim 5, wherein said strands have a diameter ranging from about 0.015 inch to about 0.030 inch.

9. A pulling tool according to claim 5, wherein said strands are arranged in a plurality of spirally extending groups with each of said groups of said strands being positioned side by side.

10. A pulling tool according to claim 9, wherein said groups of said strands are spaced apart from adjacent said groups of said strands by a distance smaller than approximately 0.100 inch.

11. A pulling tool according to claim 5, wherein said fastening means includes heat welds.

12. A pulling tool according to claim 5 wherein said strands are formed of a polymeric material.

13. A pulling tool according to claim 5, wherein said polymeric material has a smooth surface with a low coefficient of friction for allowing said sleeve to slide along the surface of the cable to be pulled during longitudinal extension and lateral contraction of said sleeve.

14. A pulling tool for gripping a member having a free end, comprising:

a nonmetallic mesh sleeve with an inner cross-sectional area formed of a plurality of thin, flexible strands interwoven together so that longitudinal compression of said sleeve causes lateral expansion of said inner cross-sectional area of said sleeve and longitudinal extension causes lateral contraction of said inner cross-sectional area of said sleeve, said sleeve having a closed lead end and an open tail end, said strands being spaced at least less than about 0.100 inch apart from any adjacent said strand, said strands being arranged in a plurality of spirally extending groups with each of said groups of said strands being positioned side by side and one of said strands in at least one of said groups of said strands having a diameter larger than at least one other of said strands in said at least one of said groups of said strands.

15. A pulling tool according to claim 14, wherein said one strand has a diameter approximately twice that of said other strand.

16. A pulling tool according to claim 14, wherein said strands have a diameter ranging from about 0.015 inch to about 0.030 inch.

17. A pulling tool according to claim 16, wherein said lead end has a first portion of said sleeve overlying a second portion of said sleeve and coupled thereto to form a loop for receiving a pulling member therein.

18. A pulling tool for gripping a member having a free end, comprising:

a nonmetallic mesh sleeve with an inner cross-sectional area formed of a plurality of thin, flexible strands interwoven together so that longitudinal compression of said sleeve causes lateral expansion of said inner cross-sectional area of said sleeve and longitudinal extension causes lateral contraction of said inner cross-sectional area of said sleeve, said sleeve having a closed lead end and an open tail end, said strands being spaced at least less than about 0.100 inch apart from any adjacent said strand, said strands being arranged in a plurality of spirally extending groups with each of said groups of said strands being positioned side by side and each of said groups having one of said strands with a diameter larger than at least one other of said strands within each of said groups.

19. A pulling tool for gripping a member having a free end, comprising:

a nonmetallic mesh sleeve with an inner cross-sectional area formed of a plurality of thing flexible strands interwoven together so that longitudinal compression of said sleeve causes lateral expansion of said inner cross-sectional area of said sleeve and longitudinal extension causes lateral contraction of said inner cross-sectional area of said sleeve, said sleeve having a closed lead end and an open tail end, said strands being spaced at least less than about 0.100 inch apart from any adjacent, said strands being arranged in a plurality of spirally extending groups with each of said groups of said strands being positioned side by side and each of said groups having one of said strands with a diameter larger than the remaining said strands within each of said groups.

* * * * *